United States Patent [19]

Keefer et al.

[11] Patent Number: 4,748,026

[45] Date of Patent: May 31, 1988

[54] PROCESS FOR PRODUCTION OF A NO-STARCH SHELF STABLE YOGURT PRODUCT

[75] Inventors: Dorothy K. Keefer, Walnut Creek; Mark E. Murray, Antioch, both of Calif.

[73] Assignee: Nabisco Brands, Inc., Parsippany, N.J.

[21] Appl. No.: 897,755

[22] Filed: Aug. 15, 1986

[51] Int. Cl.$^4$ .............................................. A23C 9/137
[52] U.S. Cl. ....................................... 426/43; 426/61; 426/583
[58] Field of Search ................. 426/43, 40, 42, 34–36, 426/522, 521, 580, 583, 409, 61–63

[56] References Cited

U.S. PATENT DOCUMENTS

| | | |
|---|---|---|
| 1,080,920 | 12/1913 | Mueler . |
| 2,253,614 | 8/1941 | Epstein et al. . |
| 2,719,793 | 10/1955 | Page et al. . |
| 2,824,804 | 2/1958 | Mishima . |
| 3,054,684 | 9/1962 | Smith . |
| 3,080,236 | 3/1963 | Ferguson . |
| 3,084,052 | 2/1963 | McLaughlin . |
| 3,235,387 | 2/1966 | Stumbo et al. . |
| 3,269,842 | 8/1966 | Mayer et al. . |
| 3,340,066 | 9/1967 | Corbin . |
| 3,359,116 | 12/1967 | Little et al. . |
| 3,385,714 | 5/1968 | Smith . |
| 3,432,306 | 3/1969 | Edwards . |
| 3,468,670 | 9/1969 | Nilsson . |
| 3,539,363 | 11/1970 | Morgan . |
| 3,932,680 | 1/1976 | Egli . |
| 3,969,534 | 7/1976 | Pavey et al. ........................ 426/34 |
| 4,066,794 | 1/1978 | Schur . |
| 4,169,854 | 10/1979 | Igoe . |
| 4,228,189 | 10/1980 | Henson . |
| 4,235,934 | 11/1980 | Egli . |
| 4,289,788 | 9/1981 | Cajigas . |
| 4,609,554 | 9/1986 | Barua et al. ........................ 426/43 |

FOREIGN PATENT DOCUMENTS

| | | |
|---|---|---|
| 842720 | 5/1970 | Canada . |
| 1182682 | 2/1985 | Canada . |
| 942109 | 11/1963 | United Kingdom . |

OTHER PUBLICATIONS

Yogurt, vol. 1, by Dr. Jeremija Lj. Rasic and Dr. Joseph A. Kurmann, pp. 242–254 and 335–337.
Science and Technology Abstracts, Chemical Abstracts 46,7667.
Food Technology Abstracts 74,306, Mar. 1986.

*Primary Examiner*—Raymond N. Jones
*Assistant Examiner*—Marianne M. Cintins
*Attorney, Agent, or Firm*—Richard Kornutik

[57] ABSTRACT

This invention provides a method for producing shelf-stable yogurt product which exhibits a smooth, non-gritty texture and enhanced storage stability and the yogurt product produced by such a method. A yogurt product that is storage stable is that which does not have to be refrigerated, i.e., can be stored at room temperature for a period in excess of a few weeks without undergoing spoilage or a substantial breakdown in texture.

30 Claims, No Drawings

PROCESS FOR PRODUCTION OF A NO-STARCH SHELF STABLE YOGURT PRODUCT

FIELD OF THE INVENTION

The present invention relates to a shelf-stable yogurt which does not contain starch as a thickening and stabilizing agent. In particular, the present invention provides a shelf-stable yogurt product which exhibits surprising thickness, smoothness and an acceptable taste without using starch and a method for making yogurt products of this type.

BACKGROUND OF THE INVENTION

Yogurt is generally known to be a product formed from milk which has been heated to an incubation or fermentation temperature, cultured with a yogurt producing culture of, for example, *Lactobacillus bulgaricus* and *Streptococcus thermophilus*, and incubated for a period of time sufficient to produce a pH of about 3.5 to about 5.0. The yogurt is then refrigerated to prevent the growth of microorganisms, and packaged for sale. The yogurt product produced by the aforementioned method must be refrigerated until a time just prior to its being eaten to prevent spoilage. Refrigerated, yogurt is stable for no more than a few weeks. The refrigeration requirement presents problems in handling, shipping and marketing.

Yogurt, most commonly marketed as the refrigerated product, has become of great commercial significance. Yogurt products have recently been and are projected to continue to be the dairy product showing the greatest market growth. The increasing popularity of yogurt, and the inherent disadvantages of handling, shipping and marketing a refrigerated, easily spoiled food product has promoted research efforts to produce a shelf-stable yogurt product. A yogurt product which is stable for several months at room temperature would have the distinct advantages of greatly reducing handling and marketing costs.

A number of research efforts have been directed to producing a shelf-stable yogurt product. Most of these efforts have involved heating the yogurt to a temperature which kills or inactivates microorganisms present in yogurt that could cause spoilage. These microorganisms were initially thought to be solely responsible for the instability that ordinary yogurts display upon room temperature storage. Later, it was discovered that milk proteins present in the yogurt also play an important role in the stability of yogurt products. It is presently believed that denaturation syneresis or "wheying off" that occurs during denaturation of milk proteins may be at least partly responsible for this instability.

As proteins denature, they unfold, changing conformation. This unfolding may result in a change in the solubility characteristics of the protein. A protein in solution or suspension before denaturation may precipitate upon denaturation as a result of the change in solubility characteristics. Milk protein, exposed to acidic conditions at room temperature over long periods of time would be expected to undergo denaturation. The change in solubility characteristics of milk proteins in yogurt causes by denaturation may be partially responsible for the limited shelf/life that storage stable yogurts of the prior art have exhibited. Perhaps a second cause of the limited shelf/life of storage stable yogurts is the syneresis phenomenon that milk proteins exhibit during denaturation.

The syneresis phenomenon is actually a two-stage process; a wheying-off stage and a curd forming stage. In the "wheying off" stage certain proteins, for example, beta-lactoglobulin and alpha-lactalbumin separate from the casein protein complex as a viscous liquid which generally appears on the surface of the yogurt. In the curd-formation stage, the remaining protein may complex with calcium or other divalent cations resulting in an insoluble complex, or curd. When the protein in yogurt undergoes syneresis, the curd and whey formation may result in a less desirable yogurt product due to a change in solubility characteristics that result in an unacceptable or gritty texture, and may also contain lumps in the form of curd.

A partial solution to the problem of denaturation and syneresis occurring during storage at room temperature has been the utilization of a heating step which results in partial denaturation of the milk proteins responsible for syneresis. It is believed that partial denaturation of the protein before storage at room temperature minimizes the effects of syneresis occuring during storage at room temperature.

An example of a prior art reference that addresses this problem is Canadian Pat. No. 1,182,682 of Nripen N. Barua and Richard J. Hampton which is incorporated by reference herein. This reference describes a process for treating yogurt to render it shelf stable.

The process of Barua, et al., utilizes a pasteurization step for inactivating spoilage microrganisms and a protein pre-conditioning step for the purpose of denaturing milk proteins. This pre-conditioning or denaturation step is performed under relatively mild conditions. Specifically, the method calls for heating a pasteurized yogurt by one of the two following methods: (1) heating at a temperature from about 140° F. to 160° F. for a period of from 5 to 20 minutes, or (2) raising the temperature of the yogurt without interruption over a period of from about 0.5 to 5.0 minutes from the temperature at which the yogurt was fermented to a homogenization temperature.

The conditions of heating the yogurt in the method of Barua, et al. must be carefully monitored so as to avoid gelatinization of starch, one of the required additives.

Starch has been considered one of the required additives for producing an acceptable shelf stable yogurt product in a number of prior art references. A number of patents in addition to Barua, et al. evidence this fact. (See U.S. Pat. Nos. 3,235,387, 3,932,680 3,969,534 and 4,235,934). However, the use of starch, although required by the methods of these references, is disadvantageous. Because starch tends to gelatinize at high temperatures, the temperature of the protein denaturation step in the method of Barua, et al. must be carefully controlled.

The requirement of the addition of starch as one of the ingredients in the method of Barua, et al. has been found to be unnecessary for producing an aseptic yogurt product. More specifically, the present applicants have found that starch is an unnecessary component in producing a shelf-stable yogurt product, and have further discovered that the addition of starch to a yogurt product which utilizes heat treatment with elevated temperatures to denature protein limits the duration and temperature at which the denaturation step can occur. Furthermore, the use of starch may be disadvantageous during storage at room temperature. It is known that starch is readily cleaved by acid hydrolysis. It is suspected that at the acidic pH of yogurt, the hydrolysis of starch may occur and shorten the duration of storage stability. The hydrolyzed starch may render the yogurt mixture less consistent and more gritty in texture.

It is also believed that all starches in part provide detrimental textural characteristics that affect the organoleptic qualities of the yogurt.

There is therefore a definite need in the art to provide a yogurt product and a process for making such product which does not include starch.

SUMMARY AND OBJECTS OF THE INVENTION

In view of the foregoing, it is an object of the present invention to provide a starch free storage stable yogurt product which should exhibit a longer duration of stability at room temperature than that produced by the prior art methods.

It is another object of the present invention to provide alternative methods for producing a shelf-stable yogurt product which does not include starch, yet has an acceptable non-gritty texture and exhibits greater stability than the prior art products.

It is also an object of this invention to provide compositions and a method for producing such compositions in which a denaturation heating step of high temperature and long duration is utilized without producing a yogurt product having a gritty texture.

It is yet another object of the invention to produce a shelf stable yogurt product in which the milk proteins responsible for producing syneresis have been highly denatured so as to provide the yogurt with a longer shelf life than the prior art products.

BRIEF DESCRIPTION OF THE INVENTION

In accordance with the foregoing objectives, this invention provides a method for producing a shelf-stable yogurt product which exhibits a smooth, non-gritty texture and enhanced storage stability and the yogurt product produced by such a method. A yogurt product that is storage stable is that which does not have to be refrigerated, i.e., can be stored to room temperature for a period in excess of a few weeks without undergoing spoilage or a substantial breakdown in texture.

In one aspect of the present invention a method of the prior art has been modified to produce a smooth texture, storage stable yogurt product with improved flavor and textural qualities which should exhibit a storage stability greater than that product made by the similar prior art method. It is a surprising result that a smooth texture shelf stable yogurt product with improved flavor can be made by a method similar to that disclosed in Barua, et al. without the use of starch. This no-starch shelf stable product should exhibit greater shelf stability than the product produced by the prior art method.

In a first embodiment of the method of the present invention a dairy base is first pasteurized/denatured, then inoculated and fermented at between about 100° F. and about 115° F. to produce a yogurt. The yogurt, at fermentation temperatures is then mixed with a starch free group of thickeners and other additives comprising at least one calcium binding vegetable gum. The admixed yogurt product is then subjected to a pre-conditioning or denaturation step at temperatures within the range of about 130° to 150° F., homogenized, and pasteurized to yield a surprisingly smooth-textured good-testing shelf stable yogurt.

In an alternative embodiment of the present invention, an improved method for producing a starch free storage stable yogurt product is provided.

In this alternative method the no starch yogurt product is subject to a process similar to the above-described method except that a denaturing step of long duration and high temperature is utilized between the addition step and the homogenization step. It has been determined that a no-starch yogurt product may be subjected to a protein denaturing step significantly higher in temperature or longer in duration than the prior art denaturing step. The effect of the more drastic denaturing conditions is to produce greater denaturing of the milk proteins responsible for syneresis. This, it is believed, will result in a longer shelf life.

It is believed that the yogurt with the longest duration of stability will be that yogurt whose protein structure exhibits the greatest denaturation without undergoing syneresis, and whose non-protein components will be of greatest stability to the acidic conditions of the yogurt product stored at or about room temperature. The product, therefore must not contain a starch compound or any compound that readily forms a gel at elevated temperatures, or that is not stable to the acidic conditions existing in yogurt at room temperature.

It is important that during the denaturing step in the process of the present invention the milk proteins do not undergo substantial syneresis. Once substantial syneresis occurs, the resulting curds will be much more difficult to homogenize to produce a smooth, non-gritty texture.

DETAILED STATEMENT OF THE INVENTION

In a first embodiment of the method of the present invention the following steps are performed on a standard dairy base:

1. pasteurizing the dairy base;
2. incubating the dairy base with a yogurt starter culture at a temperature of about 100° F. to about 115° F. and incubating the dairy base at said temperature until the pH is reduced to between about 3.5 and about 5.0 to produce a yogurt product;
3. adding a starch free mixture of thickeners, emulsifiers and other food additives comprised of at least one calcium binding vegetable gum to the yogurt product at temperatures of at least within the incubation range (step 1);
4. pre-conditioning the mixture from step 3 by raising the temperature over a period of no greater than about 10 minutes to a temperature of 150° F., or by raising the temperature of the yogurt base to a temperature of between about 125° F. and about 160° F. for a period of about 0.5 minutes to about 20 minutes;
5. homogenizing the mixture at a temperature of at most 175° F.; and
6. pasteurizing the yogurt product from step 5 within the temperature range between about 170° F. and about 210° F.

In a further embodiment of the method of the present invention, an increased shelf stable product is produced by changing the protein denaturing step (4). In this embodiment of the present invention the denaturing step is performed at a higher temperature and for a longer time than in the first embodiment. It is important that during this heating step syneresis (curd formation) be avoided. Syneresis or curd formation may be prevented in this method by adding calcium binding vegetable gums in amounts sufficient to bind substantial amounts of calcium or other divalent/ions. It is believed that curd formation may result during denaturation of the casein protein complex when phosphate groups on paracasein (a phosphoprotein of the casein complex) become exposed to free calcium ions in solution. To prevent this curd formation, sufficient quantity of calcium binding compounds are added to compete with the protein for available calcium ions.

For both aspects of the present invention the first step is comprised of pasteurizing a dairy base. It is preferable that the dairy base contain milk solids in amounts similar to that found in natural yogurt, for example between about 10% and about 15 % by weight. Desirable results are also obtained when the milk solids content of the diary base before the first pasteurization step is about 15%, for example, between about 15% and 21%. The butter fat content may be between 0.5% and 6%.

The pasteurization step is performed using techniques well known in the art. A particularly useful method employs heating the dairy base at a temperature between about 170° and 210° in a plate heat exchanger or a kiln. Temperatures above 210° F. are possible, but the pasteurization must be performed under pressure above 210° F. A preferred heating range for pasteurization is between about 180° and 195° F. After pasteurization, the mixture is cooled to incubation temperature.

The second step in the method of the present invention is the incubation or fermentation step. In this step, the pasteurized dairy base is inoculated using methods well known in the art.

Incubation is effected by inoculating the pasteurized dairy base within the temperature range of 95° F. to 115° F. with a culture of a yogurt producing microorganism, for example, *Streptocccus thermophilus* and *Lactobacillus bulgaricus*. The microorganisms are allowed to incubate until the pH of the yogurt product is about 3.5 to 5.0. Preferably, the pH of the yogurt is about 4.2–4.3, a result obtained after about 3–4 hours of incubation.

After the incubation step, the yogurt is mixed with food additives which will give the yogurt a smooth texture and consistency after the final pasteurization step. It is preferred that the mixture contain at least one calcium binding food additive. The calcium binding additive may compete with denatured milk protein for divalent cations present in milk that may be responsible for promoting curd formation. Preferred examples of such additives include EDTA and citric acid and salts of phosphates for example the sodium and potassium salts. Of course, any carboxylic acid or phosphate may be used, but citric acid is the preferred non-gum calcium binder. The citric acid that is added, may also function as a buffer to help prevent pH changes during storage. The amount of citric acid added is in the weight range of 0.01 to about 2 percent by weight of the final yogurt product.

It is preferred that calcium binding gums, for example pectin, carrageenan, and algin be added to the mixture of food additives. These calcium binding gums comprise between about 0.01% and about 7% by weight of the final yogurt product. The preferred weight range is generally less than five percent because of the tendency of the yogurt product to form lumps during processing.

Preferred examples of pectin useful in embodiments of this invention include pectin JM and pectin ASYA (available from Dow Chemical Co., Midland, Mich.). A preferred weight range of pectin is about 0.01% to about 5% by weight of the final yogurt product and most preferably about 1% of the final yogurt product.

Preferred sources of carrageenen are Sea Gel DP-379 available from Marine Colloid Division of FMC, Philadelphia, Pa. and lygomme CDS. The preferred weight range of carrageenen is about 0.05% to about 3% by weight of the final yogurt product.

Algin is preferred as the sodium salt, because of its solubility properties. A preferred source of algin is Dariloid QH ™ available from Kelco Co., Clark, N.J. The preferred weight of algin is between about 0.01% and 3% by weight.

A stabilizer is also employed in preferred embodiments of the present invention. Examples of stabilizers that may be added to yogurt include those that appear on pages 158–159 of the reference yogurt, authored by J. L. Rasic and J. A. Kurmann, distributed by Technical Dairy Publishing House, Jyllingevej 39 Dx-2720 Vanlose, Copenhagen, Denmark, which is incorporated by reference herein. Preferably, the stabilizers that are added to the yogurt product of this invention include those that are more stable to acidic hydrolysis at room temperature than is starch.

A vegetable gum stabilizer is the preferred stabilizer. Examples of such gums which can be utilized include guar gum, xanthan gum, agar-agar, and locust bean gum, among others, as well as natural and synthetic cellulose derivatives for example methylcellulose and carboxymethyl cellulose, among others. Vegetable gum stabilizers preferably comprise between about 0.05% and 10% by weight of the final yogurt product.

A gelatin stabilizer may also be preferably employed in embodiments of the present invention. A preferred gelatin is 250 Bloom gelatin available from Hormel, Co. Minnesota, U.S.A.

Other food additives that additionally may comprise the food additive mixture include sugar, preferably sucrose, which is included for its dispersant properties as well as its sweetening properties. Other sugars for example glucose and fructose, among others may also be included, but are less preferred. The added sugar preferably comprises between about 2% to about 10% by weight the final yogurt product and most preferably comprises about 4% to 5% by weight.

The mixture of food additives is preferably added as an aqueous slurry, in an effort to avoid lump formation. The amount of water added to the mixture is calculated so that the weight percent of milk solids in the final yogurt product comprises about 10% to 14% and preferably about 12 to 13% by weight.

The food additives, need not be added as an aqeuous slurry. When adding food additives in the form of powders, however the yogurt must be at elevated temperatures of at least about 100° F. Otherwise, lump formation may occur.

The pre-conditioning/denaturation step is utilized to further denature the milk proteins to promote their stability at room temperatures. In one embodiment of the present invention, the pre-conditioning step is a mild step. The mild step may be carried out by rapidly heating the yogurt product from its incubation temperature up to homogenization temperature of almost 150° F. This heating occurs over a time period of between about 0.5 and 10 minutes. Alternatively, yogurt may be heated within the temperature range of 125° and 160° F. for a period of about 0.5 minutes to 20 minutes and preferably about 0.5 minutes to 2 minutes.

It is preferred, however that the admixed yogurt be subjected to alternative denaturation heating conditions. It is, therefor, preferred that the denaturation step be effected at a temperature between about 130° F. and 185° F. for a time period of at least about 30 minutes. This denaturation step should promote additional denaturation of the milk proteins, which, in turn should promote additional shelf life of the yogurt product.

After the denaturation step, the yogurt product is homogenized. The homogenization is carried out to promote a smooth texture and non-gritty feel to the yogurt. Although prior art homogenization conditions may be used, for example, pressures of between about 1,500 and 2,000 psi, it is preferred that pressures of between about 500 and 1500 psi be used. It is most preferred that pressures of about 800 to 1200 psi be used.

Following the homogenization step, the yogurt mixture is pasteurized. As in the first pasteurization step temperatures of about 170° to about 210° F. are used in a plate heat exchange or the kiln. A preferred heating range is between 180° and 195° F. Temperatures above about 210° F. are possible with by heating under pressure.

The manner of making the present invention will be illustrated further by the following examples. It is to be understood, however, that the following examples are not presented to limit the scope of the invention, but rather to aid its practice.

GENERAL METHOD OF PREPARING YOGURT PRODUCTS OF EXAMPLES 1-6

For example 7, the same method applies, except that after mixing in the food additives, the mixture is heated within the temperature range of about 150° C. to 185° C. for a period of 45 minutes.

A dairy base is prepared in the following manner by the addition of heavy whipping cream, whole milk and non-fat dry milk. To 900 grams of whole milk, 27 grams of heavy whipping cream and non-fat dry milk was added to 18% by weight total solids. This mixture is thoroughly mixed and heated to 130° to 140° F., homogenized under two stage pressure (Gaulin two stage 15M first stage 2500 psi, second stage 500 psi), and then heated for five minutes (181°-185° F.) to effect pasteurization, and cooled to 106°-110°. The mixture is then inoculated with a yogurt producing culture (2% by weight of the dairy base) and incubated at 106°-110° F. for a period sufficient to lower the pH of the mixture to ca. 4.10-4.15. A slurry consisting of a mixture of vegetable gums, sugar, and other additives as set forth in Examples 1-6 is added to the inoculated dairy base and mixed thoroughly. This mixture is then raised to homogenization temperature within no more than 10 minutes and homogenized at 700-1,000 psi. The homogenized mixture is then pasteurized at 181°-185° for 1.5-2 minutes and then cooled to 47°-56° F. Fruit is added where desired to enhance flavor.

EXAMPLE 1

| INGREDIENT | Amount (GMS) |
| --- | --- |
| Citric Acid | 1.44 |
| Lygomme CDS | 6.30 |
| Pectin JM | 9.18 |
| Sugar | 100.70 |
| Water | 263.00 |

RESULTS

Provided a smooth texture. Viscosity measurements were taken with a Bostwick Consistometer (manufactured by Bostwick) at 60° F./30 sec. The reading was 9¾ for this sample.

EXAMPLE 2

| INGREDIENT | AMOUNT (GMS) |
| --- | --- |
| Citric Acid | 1.44 |
| Lygomme CDS | 6.30 |
| Pectin JM | 9.18 |
| Sugar | 100.70 |
| Water | 263.00 |
| Xanthan Gum | 1.50 |

RESULTS

Smooth Texture—Viscosity 60° F./30 Sec.=10½

EXAMPLE 3

| INGREDIENT | AMOUNT (GMS) |
| --- | --- |
| Citric Acid | 1.44 |
| Lygomme CDS | 4.20 |
| Pectin JM | 13.50 |
| Sugar | 100.70 |
| Water | 263.00 |

RESULTS

Good Texture—Viscosity 50° F./30 sec.=7.0

EXAMPLE 4

| INGREDIENT | Amount (GMS) |
| --- | --- |
| Citric Acid | 1.44 |
| Lygomme CDS | 4.20 |
| Pectin JM | 13.50 |
| Sugar | 100.70 |
| Methocel K-15 M | 1.28 |
| Water | 263.00 |

RESULTS

Texture is Smooth—Viscosity at 50° F./30 Sec.=8¼

EXAMPLE 5

| INGREDIENT | AMOUNT (GMS) |
| --- | --- |
| Citric Acid | 1.44 |
| Lygomme CDS | 4.20 |
| Pectin JM | 13.50 |
| Sugar | 100.70 |
| Water | 263.00 |

RESULTS

Texture is smooth—Viscosity at 52° F./30 sec.=8.0

EXAMPLE 6

| INGREDIENT | Amount (GMS) |
| --- | --- |
| Citric Acid | 1.44 |
| Lygomme CDS | 4.20 |
| Pectin JM | 13.50 |
| Sugar | 100.70 |

-continued

| INGREDIENT | Amount (GMS) |
| --- | --- |
| Agar | 3.16 |
| Water | 263.00 |

RESULTS

Texture is Smooth—Viscosity at 55° F./30 sec. is 4.2

EXAMPLE 7

| INGREDIENT | AMOUNT (grams) |
| --- | --- |
| Citric Acid | 0.5-25 |
| Lygomme CDS | 0.5-10 |
| Pectin JM | 0.5-15 |
| Sugar | 15-200 |
| Agar | 0.5-20 |
| Water | 25-500 |

RESULTS

Should result in a smooth texture and storage stability of increased duration.

We claim:

1. A method of producing an improved starch free shelf stable yogurt characterized by its smooth texture and an absence of starch:
   (a) pasteurizing a fluid homogenized dairy base by heating at a temperature between about 170° F. and about 210° F.;
   (b) fermenting said dairy base at a temperature of about 95° to 110° F. for a period of time sufficient to produce a yogurt base of pH about 3.5 to 5;
   (c) adding a starch free mixture of food additives comprising at least one calcium binding gum selected from the group consisting of algin, carrageenan and pectin in quantities sufficient to prevent the formation of appreciable syneresis at temperatures as high as 210° F. is mixed with said fermented yogurt base;
   (d) preconditioning said mixed yogurt base (step C) by continuously adjusting the temperature of said mixed yogurt base over a period of no greater than about 10 minutes to a temperature of 150° F.;
   (e) homogenizing the preconditioned yogurt base from step d to form a uniform mixture; and
   (f) pasteurizing said homogenized yogurt at a temperature of between about 170° F. and 210° F.

2. The method according to claim 1 wherein said pasteurizing steps (a and f) are carried out at a temperature of about 180° F. to about 195° F.

3. The method according to claim 1 wherein said homogenizing step (e) is carried out at a pressure of between about 500 and 1500 p.s.i.

4. The method according to claim 2 wherein said calcium binding gum comprises about 0.01% to about 7% of the final yogurt product.

5. The method according to claim 4 wherein said starch free mixture is comprised of pectin and carrageenan.

6. The product according to claim 5 wherein said mixture is further comprised of gelatin.

7. The method according to claim 5 wherein said mixture is further comprised of a stabilizer.

8. The method according to claim 6 wherein said mixture is further comprised of between about 0.05% and 10% by weight of the final product of a gum stabilizer.

9. The method according to claim 8 wherein said stabilizer is selected from the group consisting of methyl cellulose, carboxymethyl cellulose, guar gum, xanthan gum, and locust bean gum.

10. The method according to claim 9 wherein said mixture is further comprised of between about 2% and 10% by weight of the final product of sugar.

11. A method of producing an improved starch free shelf stable yogurt characterized by its smooth texture and an absence of starch comprising:
    (a) pasteurizing a fluid homogenized dairy base by heating at a temperature between about 170° F. and about 210° F.;
    (b) fermenting said dairy base at a temperature of about 95° to 110° F. for a period of time sufficient to produce a yogurt base of pH about 3.5 to 5;
    (c) adding a starch free mixture of food additives comprising at least one calcium binding gum selected from the group consisting of algin, carrageenan and pectin in quantities sufficient to prevent the formation of appreciable syneresis at temperatures as high as 210° F. is mixed with said fermented yogurt base;
    (d) preconditioning said mixed yogurt base (step C) by continuously adjusting the temperature of said mixed yogurt base to a temperature of between about 125° F. and about 160° F. and maintaining that temperature for a period of about 0.5 minutes to about 20 minutes;
    (e) homogenizing the preconditioned yogurt base from step d to form a uniform mixture; and
    (f) pasteurizing said homogenized yogurt at a temperature of between abut 170° F. and 210° F.

12. The method according to claim 11 wherein said pasteurizing steps (a and f) are carried out at a temperature of about 180° F. to about 195° F.

13. The method according to claim 11 wherein said homogenizing step (e) is carried out at a pressure of between about 500 and 1500 p.s.i.

14. The method according to claim 12 wherein said calcium binding gum comprises about 0.01% to about 7% of the final yogurt product.

15. The method according to claim 14 wherein said starch free mixture is comprised of pectin and carrageenan.

16. The product according to claim 15 wherein said mixture is further comprised of gelatin.

17. The method according to claim 15 wherein said mixture is further comprised of a stabilizer.

18. The method according to claim 16 wherein said mixture is further comprised of between about 0.05% and 10% by weight of the final product of a gum stabilizer.

19. The method according to claim 18 wherein said stabilizer is selected from the group consisting of methyl cellulose, carboxymethyl cellulose, guar gum, xanthan gum, and locust bean gum.

20. The method according to claim 19 wherein said mixture is further comprised of between about 2% and 10% by weight of the final product of sugar.

21. A method of producing an improved starch free shelf stable yogurt characterized by its smooth texture and an absence of starch comprising:
    (a) pasteurizing a fluid homogenized dairy base containing milk protein by heating at a temperature between about 170° F. and about 210° F.;

(b) fermenting said dairy base at a temperature of about 95° to 110° F. for a period of time sufficient to produce a yogurt base of pH about 3.5 to 5;

(c) adding a starch free mixture of food additives comprising at least one calcium binding gum selected from the group consisting of algin, carrageenan and pectin in quantities sufficient to prevent the formation of appreciable syneresis at temperatures as high as 210° F. and mixing with said fermented yogurt base;

(d) denaturing the protein in said mixed yogurt base (step c) by heating said yogurt base at a temperature of at least about 130° F. to about 185° F. for a period of at least about 30 minutes;

(e) homogenizing the preconditioned yogurt base from step d to form a uniform mixture; and (f) pasteurizing said homogenized yogurt base at a temperature of between about 170° F. and 210° F.

22. The method according to claim 21 wherein said pasteurizing steps (a and f) are carried out at a temperature of about 180° F. to about 195° F.

23. The method according to claim 21 wherein said homogenizing step (e) is carried out at a pressure of between about 500 and 1500 p.s.i.

24. The method according to claim 22 wherein said calcium binding gum comprises about 0.01% to about 7% of the final yogurt product.

25. The method according to claim 24 wherein said starch free mixture is comprised of pectin and carrageenan.

26. The product according to claim 25 wherein said mixture is further comprised of gelatin.

27. The method according to claim 25 wherein said mixture is further comprised of a stabilizer.

28. The method according to claim 26 wherein said mixture is further comprised of between about 0.05% and 10% by weight of the final product of a gum stabilizer.

29. The method according to claim 28 wherein said stabilizer is selected from the group consisting of methyl cellulose, carboxymethyl cellulose, guar gum, xanthan gum and locust bean gum.

30. The method according to claim 29 wherein said mixture is further comprised of between about 2% and 10% by weight of the final product of sugar.

* * * * *